US008635003B2

(12) United States Patent
Bauerle et al.

(10) Patent No.: US 8,635,003 B2
(45) Date of Patent: Jan. 21, 2014

(54) SYSTEM AND METHOD FOR CALIBRATION AND FAULT DETECTION OF NON-CONTACT POSITION SENSOR

(75) Inventors: Paul A. Bauerle, Fenton, MI (US); John Norman Stockbridge, Waterford, MI (US); J. Oscar Aparicio, Jr., Milford, MI (US)

(73) Assignee: GM Global Technology Operations LLC

( * ) Notice: Subject to any disclaimer, the term of this patent is extended or adjusted under 35 U.S.C. 154(b) by 134 days.

(21) Appl. No.: 13/085,749

(22) Filed: Apr. 13, 2011

(65) Prior Publication Data

US 2012/0265420 A1    Oct. 18, 2012

(51) Int. Cl.
*G06F 19/00*    (2011.01)

(52) U.S. Cl.
USPC ............. 701/99; 701/103; 327/512; 313/506; 250/307; 340/439; 702/45

(58) Field of Classification Search
CPC .................................. B60R 21/26; B60N 2/00
USPC ........ 701/33.7, 103, 110, 300, 99; 324/207.2, 324/207.17; 123/396, 399, 436, 525; 370/295; 320/150; 60/790; 477/125; 327/512; 313/506; 250/307; 340/439; 73/114.36, 21.59, 4.17; 702/45; 280/432

See application file for complete search history.

(56) References Cited

U.S. PATENT DOCUMENTS

| 4,041,696 | A | * | 8/1977 | Morrison | 60/790 |
|---|---|---|---|---|---|
| 4,659,977 | A | * | 4/1987 | Kissel et al. | 320/150 |
| 4,763,916 | A | * | 8/1988 | Ratsko et al. | 280/432 |
| 5,255,653 | A | * | 10/1993 | Ironside et al. | 123/399 |
| 5,415,144 | A | * | 5/1995 | Hardin et al. | 123/399 |
| 5,445,126 | A | * | 8/1995 | Graves, Jr. | 123/399 |
| 5,505,072 | A | * | 4/1996 | Oreper | 73/1.59 |
| 5,673,668 | A | * | 10/1997 | Pallett et al. | 123/436 |
| 5,754,963 | A | * | 5/1998 | Nunneley et al. | 701/33.7 |
| 5,976,056 | A | * | 11/1999 | Matsumoto et al. | 477/125 |
| 6,543,415 | B1 | * | 4/2003 | Pursifull et al. | 123/396 |
| 6,672,281 | B1 | * | 1/2004 | Cinpinski et al. | 123/396 |
| 2002/0193935 | A1 | * | 12/2002 | Hashimoto et al. | 701/110 |
| 2004/0139799 | A1 | * | 7/2004 | Sudolcan et al. | 73/204.17 |
| 2004/0260470 | A1 | * | 12/2004 | Rast | 701/300 |
| 2005/0062468 | A1 | * | 3/2005 | Wayama | 324/207.2 |
| 2005/0128063 | A1 | * | 6/2005 | Isaji et al. | 340/439 |
| 2005/0261842 | A1 | * | 11/2005 | Yamagishi et al. | 702/45 |
| 2005/0284451 | A1 | * | 12/2005 | Uhde et al. | 123/525 |
| 2006/0075809 | A1 | * | 4/2006 | Shao et al. | 73/118.2 |
| 2006/0091794 | A1 | * | 5/2006 | Agostinelli et al. | 313/506 |
| 2006/0233123 | A1 | * | 10/2006 | Lee | 370/295 |
| 2006/0255794 | A1 | * | 11/2006 | Lee | 324/207.17 |
| 2006/0267668 | A1 | * | 11/2006 | Porter | 327/512 |

(Continued)

FOREIGN PATENT DOCUMENTS

KR    2006126092    * 12/2006    ......... B60R 21/26

*Primary Examiner* — Tuan C. To
*Assistant Examiner* — Yuri Kan

(57) ABSTRACT

A control system for an engine includes a control module and a resistor. The resistor is connected in series between the control module and a non-contact position sensor. The control module selectively detects a fault of the non-contact position sensor based on a voltage drop across the resistor. A method for controlling an engine includes providing a resistor connected in series between a control module and a non-contact position sensor, and selectively detecting a fault of the non-contact position sensor based on a voltage drop across the resistor.

16 Claims, 4 Drawing Sheets

(56) References Cited

U.S. PATENT DOCUMENTS

2007/0194782 A1* 8/2007 Lee .......................... 324/207.17
2010/0320383 A1* 12/2010 Blanc ............................ 250/307
2011/0125386 A1* 5/2011 Pursifull ....................... 701/103
2012/0203442 A1* 8/2012 Pursifull ....................... 701/103
2012/0265420 A1* 10/2012 Bauerle et al. ................. 701/99

* cited by examiner

SYSTEM AND METHOD FOR CALIBRATION AND FAULT DETECTION OF NON-CONTACT POSITION SENSOR

FIELD

The present disclosure relates to engine control systems and more particularly to a system and method for calibration and fault detection of non-contact position sensors.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an induction system that may be regulated by a throttle. The throttle may include a valve that opens and closes to regulate airflow into the intake manifold. For example, the valve may be a butterfly valve. The air in the intake manifold may be distributed to a plurality of cylinders and combined with fuel to create an air/fuel (A/F) mixture. The A/F mixture may be combusted within the cylinders to drive pistons that rotatably turn a crankshaft and generate drive torque.

Electronic throttle control (ETC) includes electrically controlling the throttle based on one or more throttle position measurements. For example, a first throttle position (TPS1) may indicate a position of the throttle relative to a first position and a second throttle position (TPS2) may indicate a position of the throttle relative to a second position. Similarly, driver input may include one or more accelerator pedal position measurements. Multiple position measurements may increase both accuracy and redundancy of the associated control systems.

SUMMARY

A control system for an engine includes a control module and a resistor. The resistor is connected in series between the control module and a non-contact position sensor. The control module selectively detects a fault of the non-contact position sensor based on a voltage drop across the resistor.

A method for controlling an engine includes providing a resistor connected in series between a control module and a non-contact position sensor, and selectively detecting a fault of the non-contact position sensor based on a voltage drop across the resistor.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
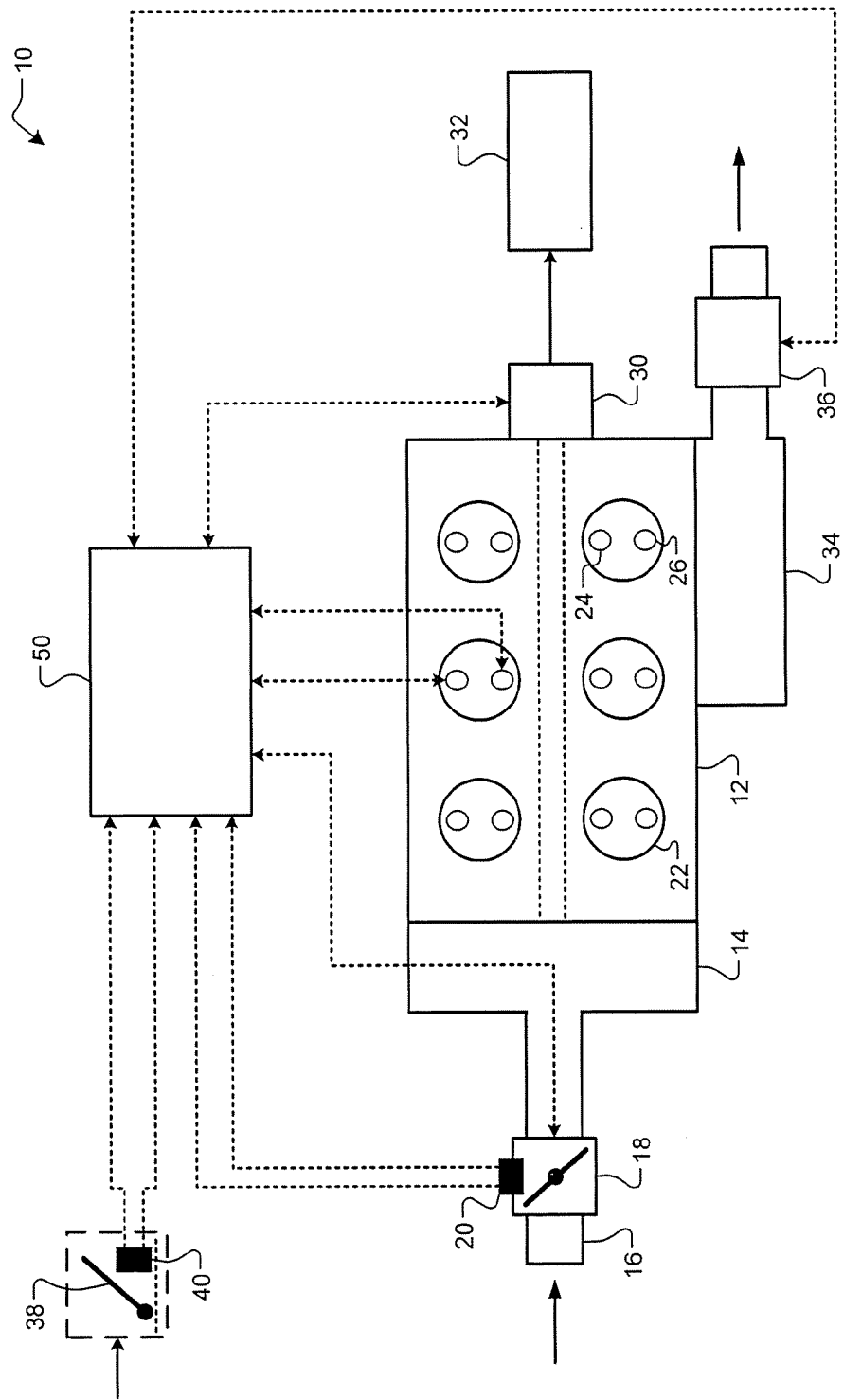
FIG. 1 is a functional block diagram of an example engine system according to one implementation of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Non-contact position sensors include a magnet and a Hall sensor that collectively produce a varying voltage based on a position of a moveable member. Specifically, the magnet may be arranged such that the magnetic field generated by the magnet is perpendicular to the Hall sensor. The voltage measured by the Hall sensor may then vary due to changes in the magnetic field caused by the Hall effect.

The moveable member may be a rotatable valve (e.g., a butterfly valve). In engine control systems, for example, non-contact position sensors may be used to measure a position of throttle and/or a position of an accelerator pedal. Non-contact position sensors, however, may also be used to measure positions of other vehicle system components such as wheel position for suspension systems, gear selection for transmission systems, headlight position for adaptive headlight systems, etc.

Non-contact position sensors may output two complimentary signals (i.e., two signals having opposite slopes). An associated control system (e.g., an electronic throttle control, or ETC system) may use both output signals when controlling the valve associated with the non-contact position sensor. For example, in a non-contact throttle position sensor (TPS), one output signal may represent a first throttle position (TPS1) and the other output signal may represent a second throttle position (TPS2).

Control systems implementing non-contact position sensors, however, may suffer from resistive shorts between the outputs of the non-contact position sensor. The resistive shorts may cause inaccurate position measurements. The inaccurate position measurements may decrease performance and/or fuel economy. Additionally, the inaccurate position measurements may cause the associated valve to be locked in a predetermined position. For example, "limp home mode" refers to when the throttle is locked in a predetermined position. Resistive shorts between the outputs of the non-contact position sensor, however, may be difficult and/or costly to detect.

Therefore, according to a first example of the present disclosure, a resistor may be implemented and connected in series between the non-contact position sensor and a control module. The control module may use the resistor to detect resistive shorts between the outputs of the non-contact position sensor. The resistor, however, may also impede calibration of the non-contact position sensor. Specifically, the resistor may decrease calibration accuracy or prevent calibration altogether. The non-contact position sensor, however, may merely require an initial calibration for an entire life of the associated control system.

Therefore, according to a second example of the present disclosure, a bypass module may be implemented in parallel across the resistor. For example only, the bypass module may include (i) a diode and a fuse, (ii) a fuse, or (iii) a transistor. The bypass module may selectively bypass the resistor allowing for initial calibration of the non-contact position sensor. After calibrating the non-contact position sensor, however, the bypass module may be disabled thereby breaking the parallel calibration path. For example only, in a diode/fuse configuration of the bypass module, the diode may be biased at a predetermined voltage causing the fuse to break. The resistor may then be used in detecting faults of the non-contacting position sensor.

Referring now to FIG. 1, an engine system 10 includes an engine 12. For example, the engine system 10 may be used to propel a vehicle. The engine 12 may include a spark ignition (SI) engine, a compression ignition (CI) engine (e.g., a diesel engine), or a homogeneous charge compression ignition (HCCI) engine. The engine system 10, however, may also include a different type of engine and/or additional components (e.g., an electric motor, a battery system, a generator, etc.) such as in a hybrid electric vehicle or an electric vehicle.

The engine 12 draws air into an intake manifold 14 through an induction system 16 that may be regulated by a throttle 18. For example, the throttle 18 may be electrically controlled via ETC. A first non-contact position sensor 20 measures one or more positions of the throttle 18. For example, the first non-contact position sensor 20 may include a magnet and a hall sensor that collectively produce a varying voltage based on a position of the throttle 18. Specifically, the first non-contact position sensor 20 may generate two complimentary signals indicating first and second positions of the throttle 18 (TPS1 and TPS2, respectively). For example, the first position TPS1 may be relative to an open throttle (e.g., 100% open) and the second position TPS2 may be relative to a closed throttle (e.g., 0% open), or vice-versa.

The air in the intake manifold 14 may be distributed to a plurality of cylinders 22. While six cylinders are shown, the engine 12 may include other numbers of cylinders. The air may be combined with fuel from a plurality of fuel injectors 24 to create an air/fuel (A/F) mixture. For example, the fuel injectors 24 may inject the fuel into intake ports of the cylinders 22, respectively (port fuel injection), or directly into the cylinders 22, respectively (direct fuel injection). Additionally, for example, the fuel injectors 24 may inject the fuel at different times depending on the type of engine.

The A/F mixture in the cylinders 22 may be compressed by pistons (not shown) and ignited by a plurality of spark plugs 26, respectively (e.g., SI engines or HCCI engines using spark assist). The air in the cylinders 22, however, may also be compressed by the pistons (not shown) and combusted by injecting the fuel into the pressurized air (e.g., CI engines, such as diesel engines). The combustion of the A/F mixture drives the pistons (not shown) which rotatably turn a crankshaft 28 generating drive torque. An engine speed sensor (not shown) may measure a rotational speed of the crankshaft 28 (e.g., in revolutions per minute, or RPM).

The drive torque may be transferred to a driveline 32 of the vehicle via a transmission 30. In some implementations, the transmission 30 may be coupled to the crankshaft 28 by a fluid coupling such as a torque converter (not shown). A transmission output shaft speed (TOSS) sensor (not shown) may measure a rotational speed of an output shaft of the transmission 30 (e.g., in RPM). For example, the TOSS may indicate a speed of the vehicle. Exhaust gas resulting from combustion may be expelled from the cylinders 22 into an exhaust manifold 34.

An exhaust treatment system 36 may treat the exhaust gas in the exhaust manifold 34 to decrease emissions before releasing the exhaust gas into the atmosphere. For example, the exhaust treatment system 36 may include one or more of catalytic converters, nitrogen oxide (NOx) absorbers/adsorbers, selective catalytic reduction (SCR) catalysts, and particulate matter (PM) filters. The engine system 10 may also include other systems including, but not limited to a turbocharger, a supercharger, and/or an exhaust gas recirculation (EGR) system.

Driver input may be received via an accelerator pedal 38. A second non-contact position sensor 40 measures one or more positions of the accelerator pedal 38. For example, the second non-contact position sensor 40 may include a magnet and a hall sensor that collectively produce a varying voltage based on a position of the accelerator pedal 38. Specifically, the second non-contact position sensor 40 may generate two complimentary signals indicating first and second positions of the accelerator pedal 38 (AP1 and AP2, respectively). For example, the first position AP1 may be relative to full pedal depression (e.g., 100% depression) and the second position AP2 may be relative to no pedal depression (e.g., 0% depression), or vice-versa.

A control module 50 communicates with and/or controls various components of the engine system 10. Specifically, the control module 50 may receive signals from the first non-contact position sensor 20, the fuel injectors 24, the spark plugs 26, the transmission 30, the exhaust treatment system 36, and/or the second non-contact position sensor 40. The control module 50 may control the throttle 18 (e.g., ETC), the fuel injectors 24, the spark plugs 26, the transmission 30, the exhaust treatment system 36, and/or the accelerator pedal 38. The control module 50 may also implement the system or method of the present disclosure.

Figure 2A:
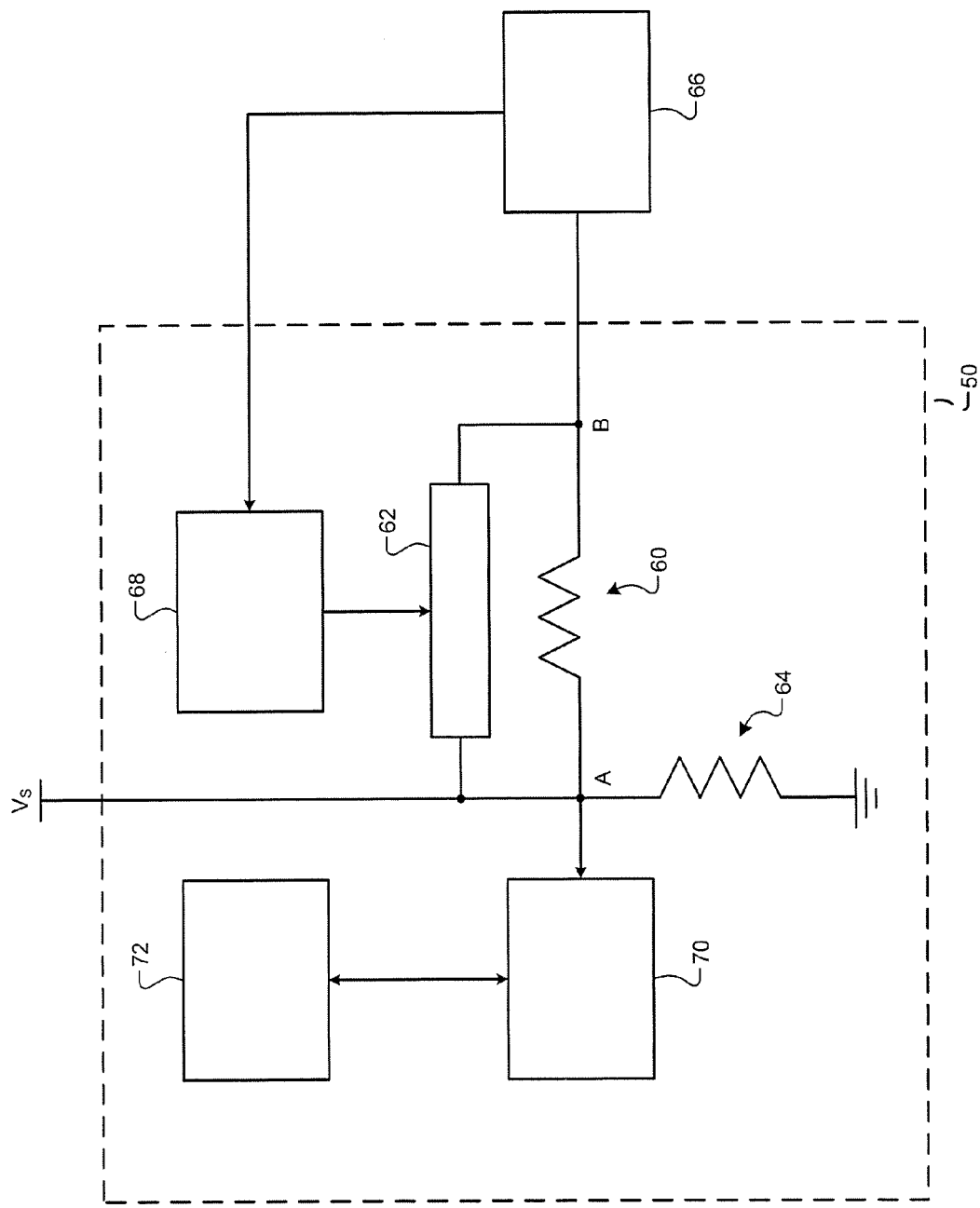
FIG. 2A is schematic of an example control module according to one implementation of the present disclosure.

Referring now to FIG. 2A, an example of the control module 50 is shown. Specifically, FIG. 2A illustrates an example configuration of the control module 50 for calibrating a non-contact position sensor (not shown). For example, the non-contact position sensor (not shown) may be the first non-contact position sensor 20 or the second non-contact position sensor 40. A resistor 60 is connected in series between the control module 50 and the non-contact position sensor (not shown). For example only, the resistor 60 may have a resistance between 1 kilo-Ohms (kΩ) and 2 kΩ). However, as shown the resistor 60 is included in the control module 50.

The control module 50 may further include a bypass module 62, a pull-down resistor 64, a calibration control module 68, a calibration module 70, and a memory module 72. The bypass module 62 is connected in parallel across resistor 60. The bypass module 62 may selectively bypass the resistor 60. Specifically, the bypass module 62 may bypass the resistor 60 during calibration of the non-contact position sensor (not shown) and may then be disabled. For example only, the pull-down resistor 64 may have a resistance of approximately 7.5 kΩ. While a pull-down resistor 64 is shown, the non-contact position sensor (not shown) may output an opposite polarity (i.e., negative slope instead of positive slope), in which case a pull-up resistor (not shown) may be implemented. For example only, the pull-up resistor (not shown) may have a resistance of approximately 220 kΩ.

During calibration of the non-contact position sensor (not shown), the control module 50 receives calibration data 66. The calibration data 66 may be predetermined. For example only, the calibration data 66 may be input by an operator during an initial calibration of the engine system 10 (i.e., before the vehicle leaves the factory). The calibration control module 68 controls the bypass module 62 during calibration of the non-contact position sensor (not shown). Specifically, during calibration the calibration control module 68 may control the bypass module such that resistor 60 is bypassed.

The calibration module 70 receives the calibration data 66 via the bypass module 62 (i.e., the bypassed path around the resistor 60). The calibration module 70 may load the calibration data 66 into the memory module 72. For example, the memory module 72 may include non-volatile memory (NVM) or another suitable type of memory. Additionally, in some implementations, the calibration module 70 may manipulate the calibration data 66 before storing the calibration data 66 in the memory module 72.

Figure 2B:
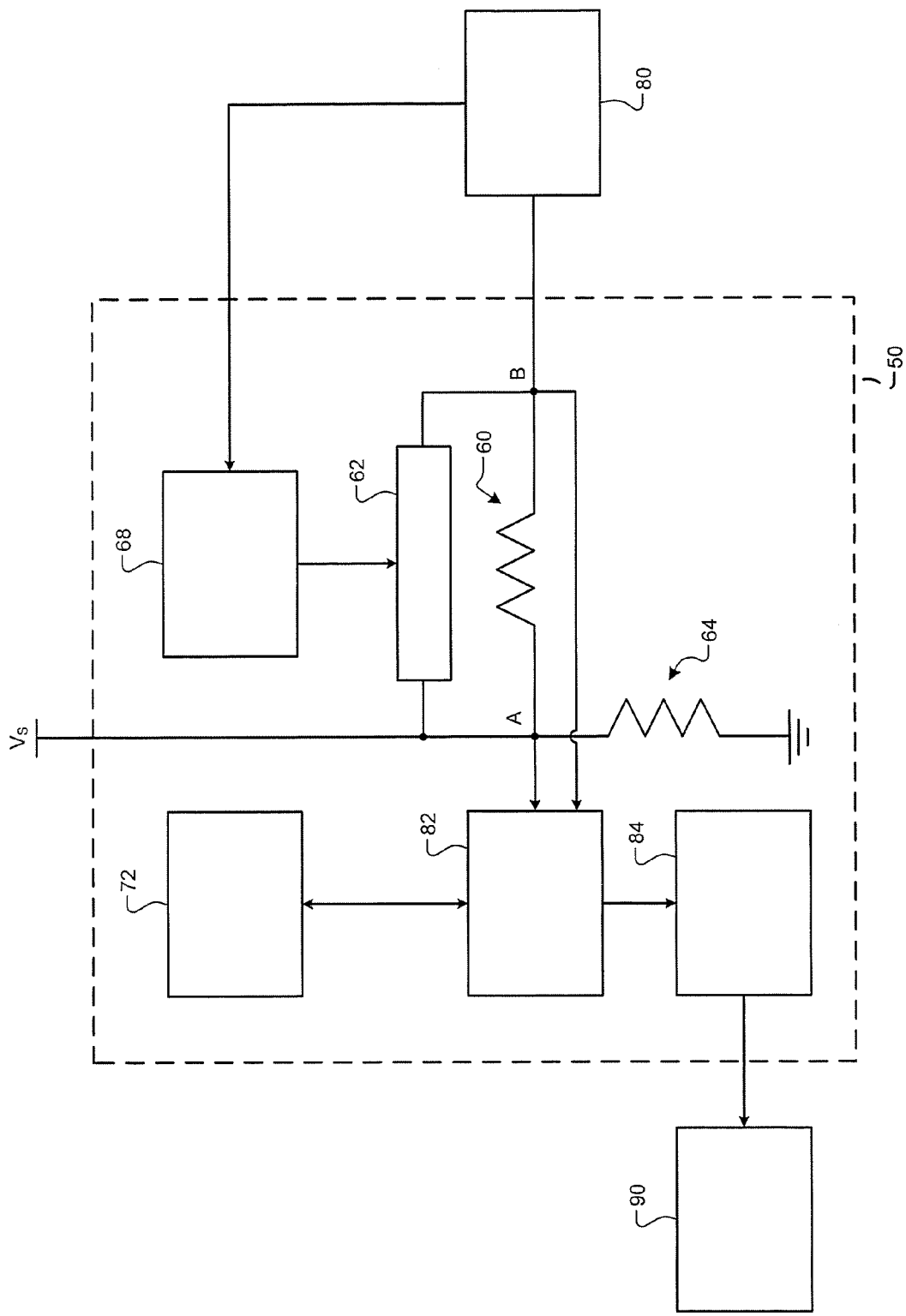
FIG. 2B is a schematic of an example control module according to another implementation of the present disclosure.

Referring now to FIG. 2B, another example of the control module 50 is shown. Specifically, FIG. 2B illustrates an example configuration of the control module 50 for operation of the non-contact position sensor 80 after calibration. The control module 50 may further include a fault detection module 82 and a component control module 84. As previously stated, the non-contact position sensor 80 may be the first non-contact position sensor 20 or the second non-contact position sensor 40. In some implementations, however, the system or method of the present disclosure may be implemented for both the first and second non-contact position sensors 20, 40. In addition, other non-contact position sensors may be implemented.

After calibration of the non-contact position sensor 80, the bypass module 62 may be disabled. Disabling the bypass module 62 may depend on the configuration of the bypass module 62. Specifically, the bypass module 62 may be disabled either by the calibration control module 68 or externally (e.g., by the operator).

For example, the bypass module 62 may include a fuse connected in parallel across the resistor 60 and a diode connected in parallel with the fuse and the supply voltage $V_S$.

According to this configuration, the calibration control module 68 may disable the bypass module 62 by driving the diode with a predetermined voltage having a magnitude greater than the supply voltage $V_S$. Driving the diode with the large predetermined voltage breaks the fuse thereby permanently disabling the bypass module 62.

Alternatively, the bypass module 62 may include a fuse connected in parallel across the resistor 60. The fuse may be broken by applying a laser beam to the fuse through a window (e.g., above the fuse). For example, the operator may apply the laser beam to the fuse. Similar to the fuse/diode combination, this operation may permanently disable the bypass module 62.

Alternatively, however, the bypass module 62 may also be temporarily disabled. Specifically, the bypass module 62 may include a transistor connected in parallel across the resistor 60. The transistor may then be selectively enabled/disabled to bypass the resistor 60. For example, the calibration control module 68 may apply a threshold voltage to a gate of the transistor during calibration thereby bypassing the resistor 60. After calibration, the calibration control module 68 may then remove the threshold voltage from the gate of the transistor after calibration (thereby disabling the bypass module 62).

After disabling the bypass module 62, the fault detection module 82 may detect faults of the non-contact position sensor 80. Specifically, the fault detection module 82 may detect faults of the non-contact position sensor 80 by monitoring a voltage drop across the resistor 60. For example, the voltage drop may be due to a resistive short between outputs of the non-contact position sensor 80. The voltage drop across the resistor 60 may be represented by a difference between a voltage at node A and a voltage at node B. When the voltage drop across the resistor 60 is greater than a threshold, the fault detection module 82 may detect a fault of the non-contact position sensor 80. The threshold may be predetermined. For example, the threshold may be based on the calibration data 66 stores in the memory module 72.

The fault detection module 82 may notify the component control module 84 when a fault is detected. When a fault is detected, the component control module 84 may control a component 90 associated with the non-contact position sensor 80. For example, the non-contact position sensor 80 may be the first non-contact position sensor 20 and the associated component 90 may be the throttle 18. In this configuration, the component control module 84 may command the throttle 18 to and lock the throttle 18 in a predetermined position corresponding to "limp-home mode."

Alternatively, for example, the non-contact position sensor 80 may be the second non-contact position sensor 40 and the associated component 90 may be the accelerator pedal 38. In this configuration, the component control module 84 may disable the accelerator pedal 38 thereby preventing driver input via the accelerator pedal 38. While these two specific configurations are discussed, the fault detection and component control may be applied to other non-contact position sensors having associated components.

Figure 3:
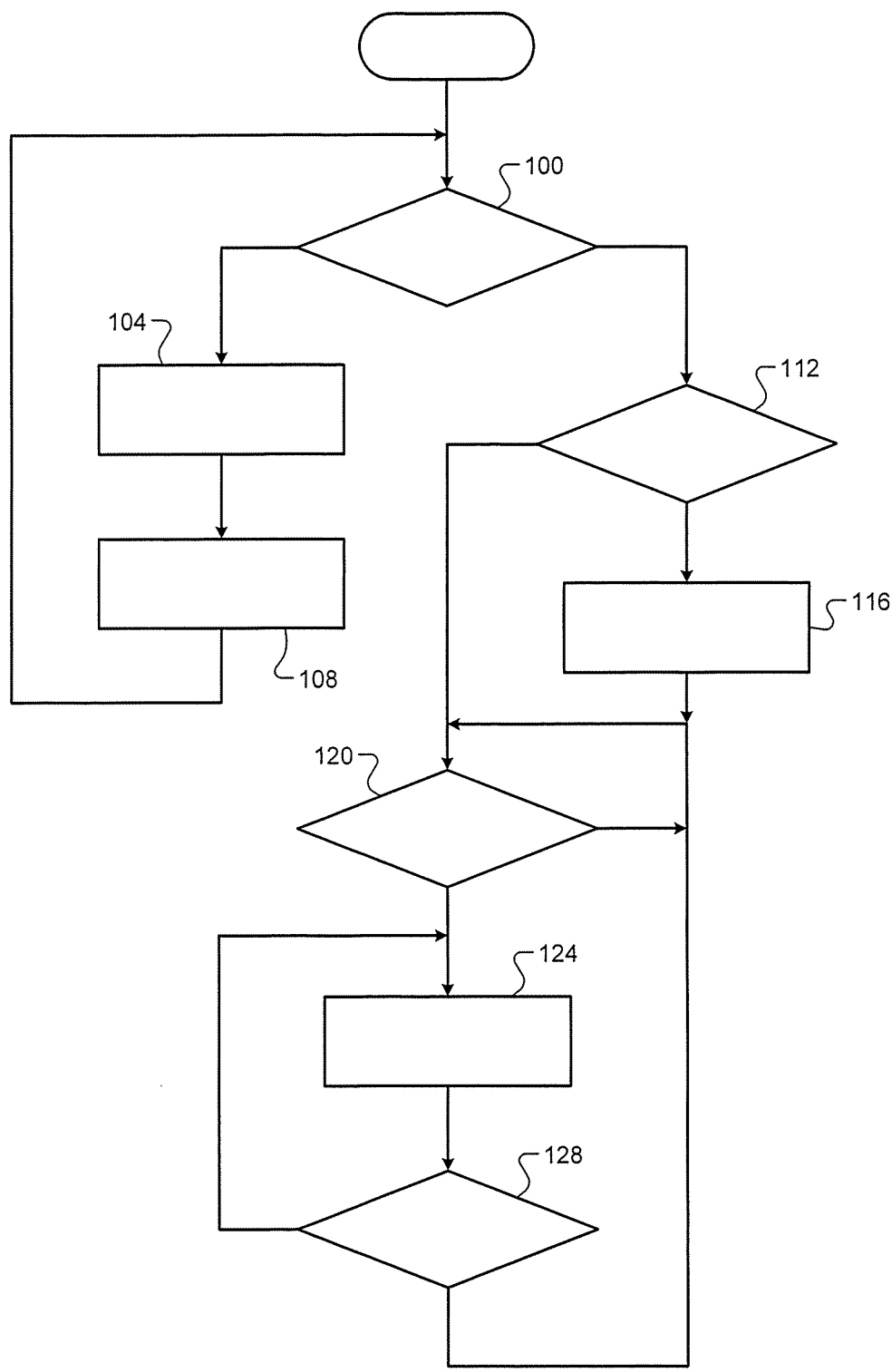
FIG. 3 is a flow diagram illustrating a method of operating a non-contact position sensor according to one implementation of the present disclosure.

Referring now to FIG. 3, a method for calibration and fault detection for a non-contact position sensor begins at 100. At 100, the control module 50 may determine whether calibration of the non-contact position sensor 80 is requested. If true, control may proceed to 104. If false, control may proceed to 112. At 104, the control module 50 may bypass the resistor 60. At 108, calibration data 66 may be loaded into the control module 50 and stored. Control may then return to 100. At 112, the control module 50 may determine whether the bypass module 62 is disabled. If true, control may proceed to 120. If false, control may proceed to 116 where the bypass module 62 is disabled.

At 120, the control module 50 may determine whether a fault of the non-contact position sensor 80 is detected. If true, control may proceed to 124. If false, control may return to 120. At 124, the control module 50 may control the component 90 associated with the non-contact position sensor 80. For example, the throttle 18 may be commanded to and locked in the predetermined position or the accelerator pedal 38 may be disabled. At 128, the control module 50 may determine whether the fault has been removed/corrected. If true, control may return to 120. If false, control may return to 124.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, the control system comprising:
   a control module;
   a resistor connected in series between the control module and a non-contact position sensor,
   wherein the control module selectively detects a fault of the non-contact position sensor based on a voltage drop across the resistor; and
   a bypass module connected in parallel across the resistor, wherein:
   the bypass module selectively bypasses the resistor,
   the bypass module bypasses the resistor during calibration of the non-contact position sensor; and
   the bypass module is disabled after calibration of the non-contact position sensor.

2. The system of claim 1, wherein the bypass module includes a fuse and a diode connected in series with the fuse, wherein the bypass module is disabled by driving the diode to a predetermined voltage to break the fuse, and wherein the predetermined voltage is greater than a supply voltage.

3. The system of claim 1, wherein the bypass module includes a fuse, and wherein the bypass module is disabled by applying a laser beam to the fuse through a window thereby breaking the fuse.

4. The system of claim 1, wherein the bypass module includes a transistor, and wherein the bypass module is disabled by removing a threshold voltage from a gate of the transistor.

5. The system of claim 1, wherein the non-contact position sensor is a non-contact throttle position sensor.

6. The system of claim 5, wherein the control module commands a throttle of the engine to a predetermined position when a fault of the non-contact throttle position sensor is detected.

7. The system of claim 1, wherein the non-contact position sensor is a non-contact accelerator pedal position sensor.

8. The system of claim 7, wherein the control module disables the accelerator pedal when a fault of the non-contact accelerator pedal position sensor is detected.

9. A method for controlling an engine, the method comprising:
   providing a resistor connected in series between a control module and a non-contact position sensor;
   selectively detecting a fault of the non-contact position sensor based on a voltage drop across the resistor; and
   providing a bypass module connected in parallel across the resistor, wherein:
   the bypass module selectively bypasses the resistor;
   the bypass module bypasses the resistor during calibration of the non-contact position sensor; and
   the bypass module is disabled after calibration of the non-contact position sensor.

10. The method of claim 9, wherein the bypass module includes a fuse and a diode connected in series with the fuse, wherein the bypass module is disabled by driving the diode to a predetermined voltage to break the fuse, and wherein the predetermined voltage is greater than a supply voltage.

11. The method of claim 9, wherein the bypass module includes a fuse, and wherein the bypass module is disabled by applying a laser beam to the fuse through a window thereby breaking the fuse.

12. The method of claim 9, wherein the bypass module includes a transistor, and wherein the bypass module is disabled by removing a threshold voltage from a gate of the transistor.

13. The method of claim 9, wherein the non-contact position sensor is a non-contact throttle position sensor.

14. The method of claim 13, further comprising commanding a throttle of the engine to a predetermined position when a fault of the non-contact throttle position sensor is detected.

15. The method of claim 9, wherein the non-contact position sensor is a non-contact accelerator pedal position sensor.

16. The method of claim 15, further comprising disabling the accelerator pedal when a fault of the non-contact accelerator pedal position sensor is detected.

* * * * *